United States Patent
Toliyat et al.

(10) Patent No.: US 9,543,879 B2
(45) Date of Patent: Jan. 10, 2017

(54) SYSTEM AND METHOD FOR CONTROLLING MULIPHASE ELECTRIC MOTORS

(71) Applicants: Chevron U.S.A. Inc., San Ramon, CA (US); The Texas A&M University System, College Station, TX (US)

(72) Inventors: Hamid Toliyat, College Station, TX (US); Masoud Hajiaghajani, Houston, TX (US); Vivek Meenakshi Sundaram, College Station, TX (US); Nwamaka Nzeocha, Houston, TX (US); Yateendra Deshpande, College Station, TX (US); Mina Rahimian, College Station, TX (US)

(73) Assignees: CHEVRON U.S.A. INC., San Ramon, CA (US); THE TEXAS A&M UNIVERSITY SYSTEM, College Station, TX (US)

( * ) Notice: Subject to any disclaimer, the term of this patent is extended or adjusted under 35 U.S.C. 154(b) by 310 days.

(21) Appl. No.: 14/223,318

(22) Filed: Mar. 24, 2014

(65) Prior Publication Data
US 2015/0270799 A1 Sep. 24, 2015

(51) Int. Cl.
*H02P 7/00* (2016.01)
*H02P 25/22* (2006.01)

(52) U.S. Cl.
CPC ........... *H02P 25/22* (2013.01); *H02P 29/0241* (2016.02); *H02P 29/60* (2016.02)

(58) Field of Classification Search
CPC ......... H02P 25/22; H02P 6/10; H02P 29/0038; H02P 29/0044
USPC .............. 318/474, 400.26, 400.41, 706, 707, 722,318/724, 432, 433
See application file for complete search history.

(56) References Cited

U.S. PATENT DOCUMENTS

| | | | | |
|---|---|---|---|---|
| 4,761,602 A * | 8/1988 | Leibovich | ............ | H02K 17/16 310/180 |
| 6,710,495 B2 * | 3/2004 | Lipo | ....................... | H02K 3/28 310/184 |
| 6,888,330 B2 * | 5/2005 | Arimitsu | ................. | H02P 6/085 318/433 |
| 7,659,686 B2 * | 2/2010 | Osada | ....................... | H02P 5/74 318/148 |
| 7,667,418 B2 * | 2/2010 | Kascak | ............... | F16C 32/0446 318/400.02 |
| 8,264,190 B2 * | 9/2012 | Suzuki | ................. | B62D 5/0403 318/432 |
| 8,278,850 B2 * | 10/2012 | Gallegos-Lopez | | H02M 7/53873 318/400.02 |

(Continued)

*Primary Examiner* — Bentsu Ro
*Assistant Examiner* — Thai Dinh
(74) *Attorney, Agent, or Firm* — Pillsbury Winthrop Shaw Pittman, LLP

(57) ABSTRACT

Controlling a multiphase electric motor by controlling the transmission of power to a first set of phases of a multiphase electric motor in accordance with a first operating configuration; detecting the presence of a shorted phase in the first set of phases while the first set of phases are being operated in accordance with the first operating configuration; and, responsive to detection of the shorted phase, adjusting control of the transmission of power to the multiphase electric motor such that power is transmitted to a second set of phases in accordance with a second operating configuration.

22 Claims, 4 Drawing Sheets

(56) References Cited

U.S. PATENT DOCUMENTS

| | | | | |
|---|---|---|---|---|
| 8,884,486 B2* | 11/2014 | Haldemann | ......... | H02P 23/0004 |
| | | | | 310/184 |
| 8,981,704 B2* | 3/2015 | Endo | ...................... | B62D 5/046 |
| | | | | 318/400.01 |
| 2013/0207586 A1* | 8/2013 | Hayashi | .................. | H02P 25/22 |
| | | | | 318/490 |
| 2014/0009093 A1* | 1/2014 | Suzuki | ................ | H02P 21/0096 |
| | | | | 318/400.02 |
| 2014/0103850 A1* | 4/2014 | Frank | ..................... | H02K 11/33 |
| | | | | 318/496 |
| 2014/0246999 A1* | 9/2014 | Kezobo | ................ | B62D 5/0484 |
| | | | | 318/400.23 |
| 2014/0253006 A1* | 9/2014 | Satou | .................... | H02P 29/032 |
| | | | | 318/442 |
| 2016/0072416 A1* | 3/2016 | Hirotani | .................. | H02P 25/22 |
| | | | | 318/400.02 |

* cited by examiner

SYSTEM AND METHOD FOR CONTROLLING MULIPHASE ELECTRIC MOTORS

FIELD OF THE DISCLOSURE

This disclosure relates to electrical motors and in particular for electrical motors used in electrical pumps for high power offshore submersible pump applications.

BACKGROUND

Electrical motors for use in high power offshore submersible pump applications, such as oil wells, typically use three-phase asynchronous induction motors with two poles and a distributed winding. The low pole number enables high speed operation at around 3500 rpm when using 60 Hz supply. The induction motors are also typically driven by a variable frequency drive that enables operations at varying speeds depending on the required flow rates through a submersed pipe.

Due to the high temperature in the well improper cooling and overloading can result in breakdown of ground wall insulation leading to stator inter-turn and phase-to-ground faults. Additionally, due to the long length of the electric cable providing power to the electric motor, there is an increased risk of a reflected voltage wave increasing the instantaneous voltage at the motor terminals above their rated value, especially during start-up of the motor. This phenomenon can also lead to insulation breakdown and cause phase-to-phase or phase-to-ground faults. Such faults lead to the loss of one or more phases, rendering the motor inoperable and in need of replacement. Typical motors, have overlapping end windings allowing faults to migrate to healthy phases leading to phase-to-phase faults.

When a motor fails it may need to be replaced. Replacing an electrical motor, such as in a submersible electronic pump, may be time consuming and costly.

SUMMARY

Increasing the number of phases for the electric motor in an electrical pump allows the electrical pump to perform after one or more phases has failed. Additionally, avoiding overlap of the phases, such as with a fractional slot per pole per phase (SPP) ratio, which produces windings with minimal to no overlap between the phases, may reduce likelihood of phase-to-phase faults. Such windings may be used with induction, permanent magnet synchronous motors (PMSM), synchronous reluctance motors (SynRM) and permanent magnet assisted synchronous (PMa-SynRM) reluctance motors.

When one or two phases of a high number phase motor are in fault, it is possible to continue operation of the motor using the remaining phases. For example, if the electric motor is a five-phase electric motor, the motor may still operate when one phase, or even two phases, are in fault. Such motors may have a minimum number of phases not in fault in order to remain operational.

When one or more phases are in fault, the phase shift between the remaining healthy phases is determined to satisfy certain constraints. Such constraints may include: configuring the system so that the total instantaneous current is approximately zero, ensuring that there is no sequence current present which can lead to bearing failure losses; and/or, configuring the second harmonic torque ripple to be approximately zero. For permanent magnet type motors an analytical field solution of the air gap flux density due to the magnets may be used to calculate the required phase shifts between the currents in the healthy phases to reduce the second harmonic torque. A more accurate compensation may be achieved by injecting third harmonic currents to additionally reduce the fourth harmonic torque ripple that is created during phase faults. For induction and SynRM motors a more accurate compensation may be achieved by including the effect of third harmonic magneto-motive force (MMF) produced by the stator winding. By injecting third harmonic currents it may be possible to reduce the second harmonic torque when operating under fault and achieve higher average torques.

One aspect of the disclosure relates to a method for controlling a multiphase electric motor. The multiphase electric motor may be configured to drive a downhole electrical submersible pump (ESP). Providing a motor capable of operating when one or more of the phase windings have a fault increases the operational life of the motor between maintenance sessions. Decreasing downtime, especially when used in ESP applications, reduces the cost of workovers, reduces costs in various operational areas, and brings a significant enhancement to well profitability.

The method may comprise the steps of controlling transmission of power to a first set of phases of a multiphase electric motor in accordance with a first operating configuration. The first operating configuration may be any operating configuration. The first operating configuration may include a standard vector control scheme with space vector pulse width modulation (SVPWM). There may be any number of phases in the first set of phases of the multiphase electric motor. For example, the number of phases may include three phases, five phases, seven phases, or more phases, such as n phases. In some implementations the multiphase electric motor contemplated has in excess of three phases allowing operation of the electric motor to continue subsequent to a failure of one or more phases. Controlling the transmission of power may comprise monitoring the transmission of power to the first set of phases of the multiphase electric motor.

The method may comprise the step of detecting a shorted phase in the first set of phases while the first set of phases are being operated in accordance with the first operating configuration. A shorted phase may be an indication that the phase has a fault. The step of detecting a shorted phase may comprise obtaining a resistance measurement. Such resistance measurement may be performed by an on-line DC voltage application to the system. For example, a faulty phase may include a phase having a short circuit. A short circuit in any phase of the electric motor may reduce the overall resistance of the electric motor. A relatively small DC voltage may be injected through an inverter of the electric motor. The current of the injected DC voltage may be measured to obtain an estimation of the DC resistance of the individual phase windings of the electric motor. The DC resistance of individual ones of the phase windings may be compared with each other and compared with previous measurements to obtain a measure of change of the DC resistance of individual ones of the phase windings. The measurement of the DC resistance may be discrete, wherein the on-line DC circuits may be activated at predetermined and/or selected intervals, and/or as desired, to obtain the DC resistance measurements. A faulty phase winding may be determined based on the DC resistance measurements for the phase indicating that the phase has a short circuit.

The temperature of the phase windings may affect the resistance of the phase windings and therefore, if not accounted for, may give a false measurement that a phase is in fault. Temperature typically affects the phase windings uniformly, and therefore, by comparing the changes in resistance of each of the individual phases the effect of temperature can be accounted for. During manufacture of the phase windings, the phase windings may not be balanced properly, and therefore unbalances in the phase windings created during manufacture may also be accounted for.

Responsive to the detection of a shorted phase, the control of the transmission of power to the multiphase electric motor may be controlled, such that power may be transmitted to a second set of phases in accordance with a second operating configuration. The second operating configuration may be configured such that the second set of phases are controlled to lower the torque pulsation while maintaining the same copper loss as with the first operating configuration. The currents and/or phase shifts provided to the electric motor in the second operating configuration typically depend upon on the design of the motor. Where the second set of phases comprises all of the phases of the first set of phases, barring the faulty phase, the motor may operate with reduced capacity. The first set of phases and the second set of phases may have at least one common phase.

The timing at which the at least one common phase receives power in the first configuration may be different than the timing at which the common phase receives power in the second configuration. The timing may be predetermined to achieve minimum torque pulsation while maintaining total copper loss at the same level as when the motor is operating in the first operating configuration. The power received in each phase may be continuous. The timing of occurrence of maximum power or zero power may change depending on the rotor position of the motor.

Controlling the transmission of power further comprises monitoring the transmission of power to the first set of phases of the multiphase electric motor. Such monitoring of the transmission of power to the electric motor may comprise monitoring one or more of the positive sequence, negative sequence, and/or zero sequence current and/or voltage signatures of the power transmitted to the first set of phases of the multiphase electric motor, and/or the resistance of individual ones of the first set of phases of the multiphase electric motor. In some implementations, monitoring the DC resistance of the stator phase windings may be accomplished by injecting small DC voltages using the inverter. This detects the occurrence of a phase fault. The monitoring may further comprise monitoring the phase voltages and currents of the motor through one or more sensors to determine whether one or more of the stator phase windings has a short circuit. Such monitoring through sensors may be performed continuously as the motor operates or discretely at predetermined intervals. In some implementations, the faulty phase may be opened as soon as a short circuit is detected.

The step of detecting a faulty phase in the first set of phases while the first set of phases are being operated in accordance with the first operating configuration may further comprise determining parameters for the transmission of power to the multiphase electric motor such that the power is transmitted to a second set of phases in accordance with the second operating configuration. The second operating configuration may comprise operating the motor so that one or more parameters of the motor are maintained within predetermined thresholds. Determining parameters for the transmission of power to the multiphase electric motor may include: determining a current magnitude for the power transmitted to individual ones of the second set of phases of the multiphase electric motor; and/or determining a phase of a current for the power transmitted to individual ones of the second set of phases of the multiphase electric motor.

The determined current magnitude for the power transmitted to individual ones of the second set of phases may be determined such that a total copper loss for the electric motor being operated in the second operating configuration is within a defined threshold of the total copper loss for the electric motor being operated in the first operating configuration.

The phase shift for the current of the power transmitted to individual ones of the second set of phases may be determined such that the standard harmonic torque ripple of the second set of phases of the electric motor being operated in the second operating configuration is within a defined threshold of a standard harmonic torque ripple for the electric motor being operated in the first operating configuration, and the total zero sequence current is zero. In some implementations, the zero sequence current may be proportional to the sum of the instantaneous currents applied to the healthy phases.

Adjusting control of the transmission of power to the multiphase electric motor such that power is transmitted to a second set of phases in accordance with a second operating configuration may comprise transmitting power having a current with a determined current magnitude and a determined phase shift to individual ones of the second set of phases.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Increasing the number of phases for the electric motor in an electrical pump allows the electrical pump to perform after one or more phases has failed. Additionally, avoiding overlap of the phases, such as with a fractional slot per pole per phase (SPP) ratio, which produces windings with minimal to no overlap between the phases, may reduce phase faults from propagating to the other phases. Such windings may be used with induction, permanent magnet synchronous motors (PMSM), synchronous reluctance motors (SynRM) and permanent magnet assisted synchronous (PMa-SynRM) reluctance motors.

When one or two phases of a high number phase motor are in fault, it is possible to continue operation of the motor using the remaining phases. For example, if the electric motor is a five-phase electric motor, the motor may still operate when one phase, or even two phases, are in fault. Such motors may have a minimum number of phases not in fault in order to remain operational.

When one or more phases are in fault, the phase shift between the remaining healthy phases is determined to satisfy certain constraints. Such constraints may include: configuring the system so that the total instantaneous current is approximately zero, ensuring that there is no zero sequence current present which can lead to bearing failure losses; and/or, configuring the second harmonic torque ripple to be approximately zero. For permanent magnet type motors an analytical field solution of the air gap flux density due to the magnets may be used to calculate the required phase shifts between the currents in the healthy phases to reduce the second harmonic torque. A more accurate compensation may be achieved by injecting third harmonic currents to additionally reduce the fourth harmonic torque ripple that is created during phase faults. For induction and SynRM motors a more accurate compensation may be achieved by including the effect of third harmonic magnetomotive force (MMF) produced by the stator winding. By injecting third harmonic currents it may be possible to reduce the second harmonic torque when operating under fault and achieve higher average torques.

Figure 1:
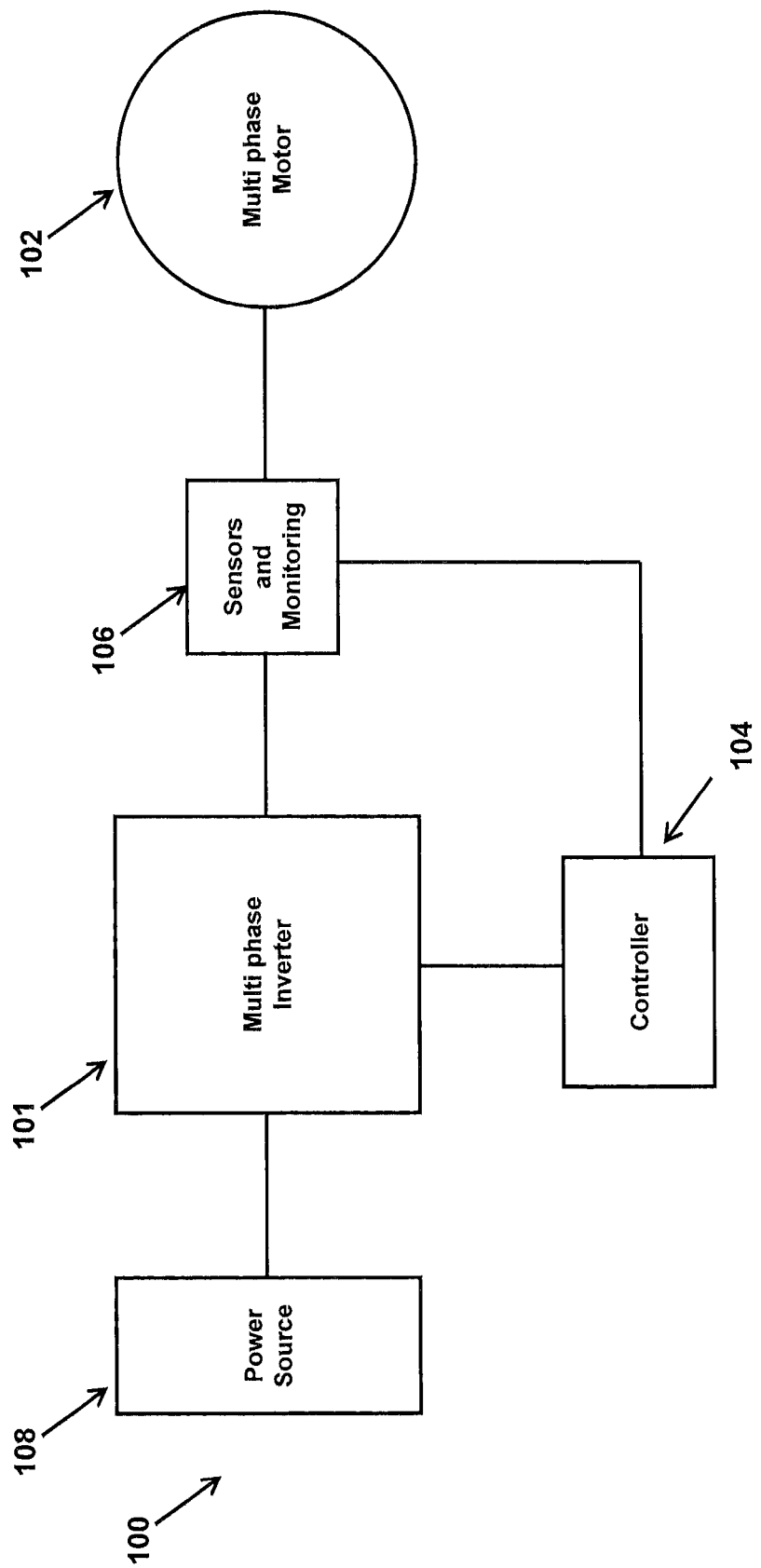
FIG. 1 illustrates a system for controlling a multiphase electric motor, in accordance with one or more implementations.

FIG. 1 illustrates a system 100 for controlling a multiphase motor 102. The multiphase motor may comprise n phases. In some implementations, the multiphase motor may comprise five phases. The system 100 may comprise a controller 104 configured to control transmission of power, delivered by inverter 101, to a first set of phases of a multiphase electric motor 102 in accordance with a first operating configuration. The first set of phases may comprise select individual ones of the n phases of the multiphase electric motor 102. In some implementations, the first set of phases may comprise all of the n phases of the multiphase electric motor 102.

The first operating configuration may be any operating configuration. The first operating configuration may include a standard vector control scheme with space vector pulse width modulation (SVPWM). Space vector modulation (SVM) is an algorithm for the control of pulse width modulation (PWM).

The system 100 may also comprise a sensors/monitoring device 106. The monitoring device 106 may be configured to monitor any number of parameters of the electric motor 102. The monitoring device 106 may be configured to detect a shorted phase in the first set of phases of the electric motor 102, while the first set of phases are being operated in accordance with the first operating configuration. The monitoring device 106 may comprise a single monitoring device configured to monitor the state of all phases in the electric motor 102. In other implementations the monitoring device 106 may comprise multiple individual monitoring devices individually configured to monitor the state of individual ones of the phases in the electric motor 102. Individual monitoring devices may be electronically connected such that the system 100 may monitor the state of individual ones of the phases of the electric motor 102.

Figure 2:
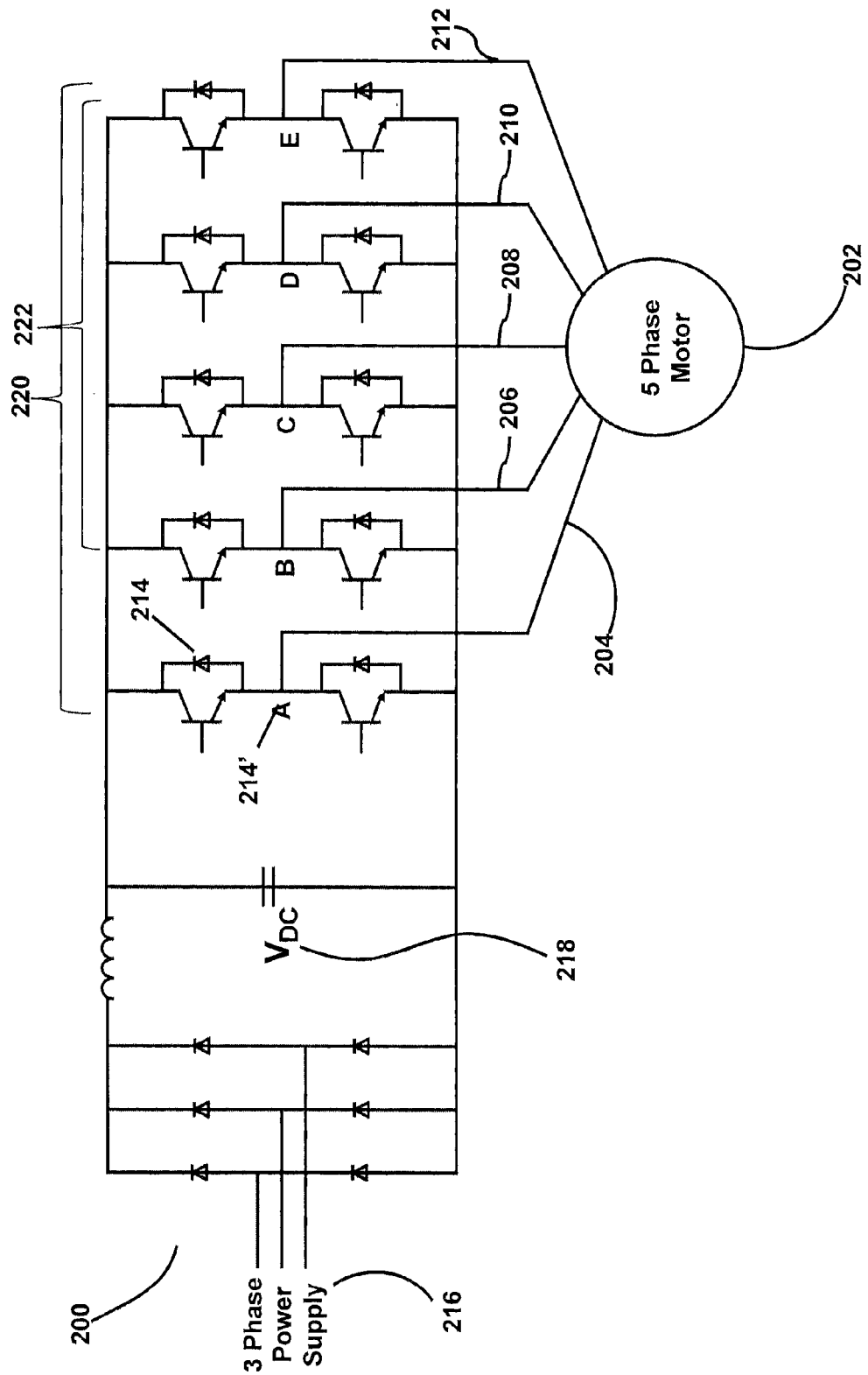
FIG. 2 illustrates a circuit diagram for a multiphase current regulated PWM motor drive, in accordance with one or more implementations.

With reference to FIG. 2, shown is a circuit diagram 200 for a multiphase electric motor 202, specifically a five-phase electric motor. The monitoring device 106 may comprise voltage sensors (not shown) configured to measure the DC voltage applied to individual ones of the first set of phases 220 of the electric motor 202. The DC voltage for monitoring the phases may be be applied using the inverter by the controller 104 (as shown in FIG. 1). The monitoring system may include current sensors on each phase 204, 206, 208, 210, 212 of the inverter output to measure the current for controlling the motor 202 and for monitoring the phases (DC component). The DC voltage may be additionally be monitored using voltage sensors (not shown) also located on each phase 204, 206, 208, 210, 212 in the inverter output. The DC voltage may be supplied from a DC power source 218 by the inverter. The DC voltage and current sensors may be configured to determine an indication of lower resistance in individual ones the phases in the first set of phases 220, indicating that one or more of the individual ones of phases may have a short. Once a short is detected in one or more of the phases of the first set of phases, the controller 104 (as shown in FIG. 1) may be configured to open the one or more faulty phases, such that AC current is no longer passed through the faulty phases. For example, if there is a fault in the A phase in FIG. 2, switches 214 and 214' may be opened to prevent AC current from being passed through the faulty A phase. Switches 214 and 214' may be switches operated by servos, in other implementations switches 214 and 214' may be an electronic switch, such as a relays, solid-state replays, analogue switches and/or other switch types. Each phase 204, 206, 208, 210, 212 may have a set of switches similar, or the same as, those in the A phase.

In some implementations, the controller 104 (as shown in FIG. 1) may be configured to inject a relatively small DC voltage through the inverter 101 into one or more of the phases of the electric motor 202, through connectors 204, 206, 208, 210, 212. The monitoring device 106 may be configured to measure the current due to the injected DC voltage and the DC voltage to obtain an estimation of the DC resistance of the individual phase windings of the electric motor 202.

The DC resistance of individual ones of the phase windings may be compared with each other and compared with previous measurements to obtain a measure of change of the DC resistance of individual ones of the phase windings. The measurement of the DC resistance may be discrete, wherein the DC voltage may be applied by the controller 104 to phases A, B, C, D, and E, at predetermined and/or selected intervals, and/or as desired, to obtain the DC resistance measurements. A faulty phase winding may be determined based on the DC resistance measurements for the phase indicating that the phase has a short circuit.

The temperature of the phase windings may affect the resistance of the phase windings and therefore, if not accounted for, may give a false measurement that a phase is in fault. Temperature typically affects the phase windings uniformly, and therefore, by comparing the changes in resistance of each of the individual phases the effect of temperature can be accounted for. During manufacture of the phase windings, the phase windings may not be balanced properly, and therefore unbalances in the phase windings created during manufacture may also be accounted for.

FIG. 2 shows a five phase inverter for a five phase electric motor 202, however, the current invention contemplates a motor and inverter having any number of phases. The inverter must be controlled so that at no time are both switches 214 and 214', in the same leg, A, B, C, D, and E, connected. If both switches 214 and 214' are connected at the same time the DC supply would be shorted and the monitoring device 106 (as shown in FIG. 1) would register a false short in that leg of the phase inverter. To meet this requirement the switches 214 and 214' may be operated in a complementary fashion, such that when switch 214 is on, switch 214' is off. This complementary operation of the switches may occur in each of the legs, A, B, C, D, and E. In some implementations, a select number of phases, and therefore a select number of legs A, B, C, D, and E, of the phase inverter, will be operated, for example legs A, B, and C, only.

In order to implement space vector modulation a reference signal is generated from n separate phase references (where n is the number of phases in operation) using the $\alpha\beta\gamma$ transformation.

Figure 4:
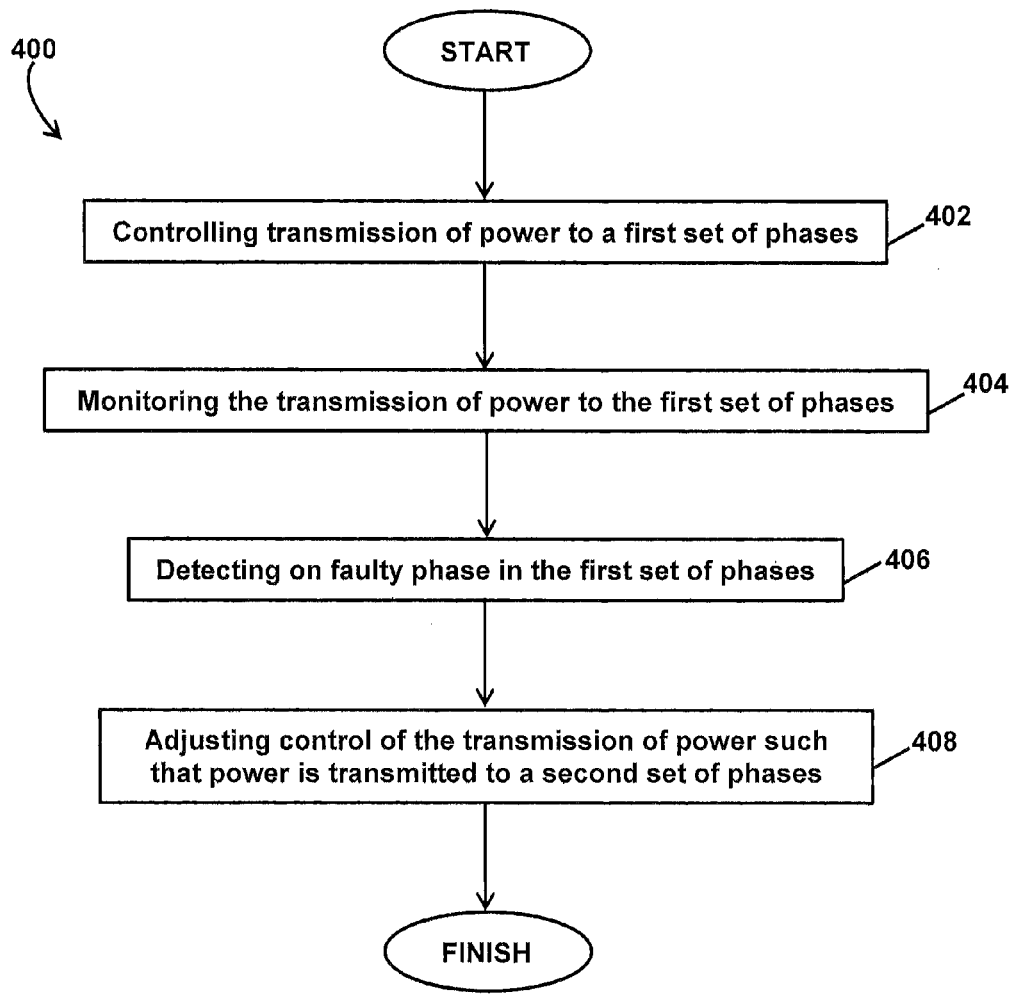

In response to detection of the shorted phase by the monitoring device 106, the controller 104 may be configured to adjust control of the transmission of power, from the power source 108, to the multiphase electric motor 102 such that power is transmitted to a second set of phases in accordance with a second operating configuration. With reference to FIG. 4, in response to the detection of a shorted phase in the first set of phases 220, power, from the power source 216, may be provided to a second set of phases 222, where the second set of phases 222 does not include the shorted phase. In the illustration shown in FIG. 2, the shorted phase may be the phase connected to the inverter through connection 204 and associated with leg A of the inverter. In other implementations, the first set of phases may comprise all phases of the electric motor 202. The second set of phases 222, which excludes the one or more shorted phases, may include all phases of the electric motor 202, excluding the shorted phase. For example, if the first set of phases 220 included all phases of the electric motor 202, and after detecting that the phase associated with the leg A is shorted, the second set of phases 222 would include the phases associated with legs B, C, D, and E.

In such implementations the first set of phases 220 and the second set of phases 222 may have at least one common phase. In the previous example, the at least one common phase includes phases associated with legs B, C, D, and E. In some implementations, the timing at which the common phase receives power in the first configuration is different than the timing at which the common phase receives power in the second configuration. The timing may be predetermined to achieve minimum torque pulsation while maintaining total copper loss at the same level as when the motor is operating in the first operating configuration. The power received in each phase may be continuous. The timing of occurrence of maximum power or zero power may change depending on the rotor position of the motor.

The multiphase electric motor 102 (as shown in FIG. 1) may be configured to drive a downhole electrical submersible pump (ESP). Providing a motor capable of operating when one or more of the phase windings have a fault increases the operational life of the motor between maintenance sessions. Decreasing downtime, especially when used in ESP applications, reduces the cost of workovers, reduces costs in various operational areas, and brings a significant enhancement to well profitability.

The monitoring device 106 (as shown in FIG. 1) may be configured to monitor the transmission of power to the first set of phases of the multiphase electric motor. The monitoring device 106 may be further configured to monitor one or more of the positive sequence, negative sequence, and/or zero sequence current and/or voltage of the power transmitted, from the power source 108, to the first set of phases of the multiphase electric motor 102, and/or the resistance of individual ones of the first set of phases of the multiphase electric motor 102.

The controller 104 may be configured to determine parameters for the transmission of power to the multiphase electric motor 102, such that the power is transmitted to a second set of phases in accordance with the second operating configuration. The second operating configuration may be such that the system 100 is adapted to determine parameters for the transmission of power to the second set of phases of electric motor 102 such that the electric motor 102 is operated within one or more defined thresholds of the first operating configuration.

The current magnitude for the power transmitted to individual ones of the second set of phases may be determined such that a total copper loss for the electric motor being operated in the second operating configuration is within a defined threshold of the total copper loss for the electric motor being operated in the first operating configuration. The phase for the current of the power transmitted to individual ones of the second set of phases may be determined such that a standard harmonic torque ripple of the second set of phases of the electric motor being operated in the second operating configuration is within a defined threshold of a standard harmonic torque ripple for the power transmitted to the electric motor being operated in the first operating configuration, and the total zero sequence current is zero. The controller 104 may be further configured to transmit power having a current with a determined current magnitude and a determined phase shift to individual ones of the second set of phases.

When a phase of a multi-phase electric motor (such as electric motor 102 in FIG. 1) are opened due to a fault it is possible to continue to generate a rotating magnetic field using the remaining phases. For example, with a five-phase electric motor it is possible to have one phase, or even two phases, opened due to faults and continue to generate a rotating magnetic field using the remaining four, or three, phases. However, applying current with the same current magnitudes and phase shifts to the second set of phases, as applied to the first, will result in a high torque pulsation due to the loss of one or more phases. As previously stated, the current magnitudes to be applied to the second set of phases in the second configuration are chosen to keep the total copper loss within a determined threshold of when the electric motor is operating in the first configuration with the first set of phases. Operating the electric motor in such a manner maintains the operating temperature of the motor within a defined threshold, minimizing the need for additional cooling while operating the electric motor in the second configuration.

The phase shift of the current applied to the second set of phases is determined to satisfy various constraints. Firstly, the phase shift of the current applied to the second set of phases is determined such that the total instantaneous current applied to all phases in the second set of phases is within a determined threshold of zero. This reduces zero sequence current, the presence of which may lead to bearing failure and losses, necessitating early replacement of the electric motor.

Figure 3A:
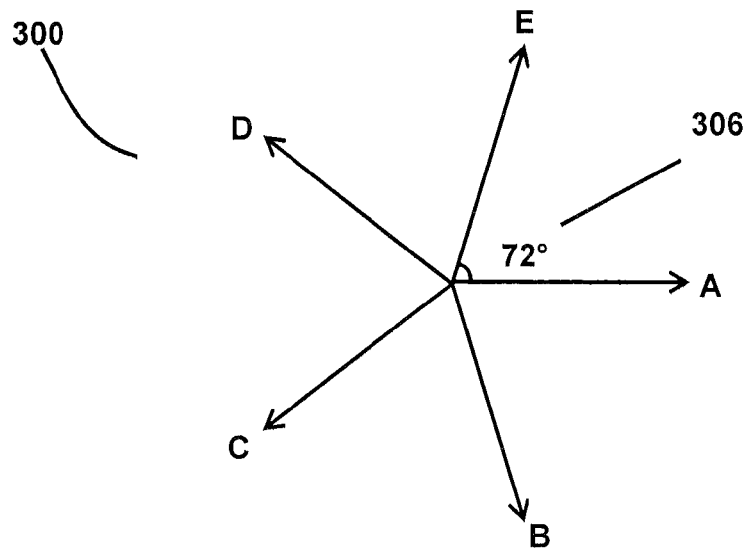
FIGS. 3A-3C illustrate phase shifts for a multiphase motor under different operating configurations, in accordance with one or more implementations; and, FIG. 4 illustrates a method for controlling a multiphase motor, in accordance with one or more implementations.
Figure 3B:
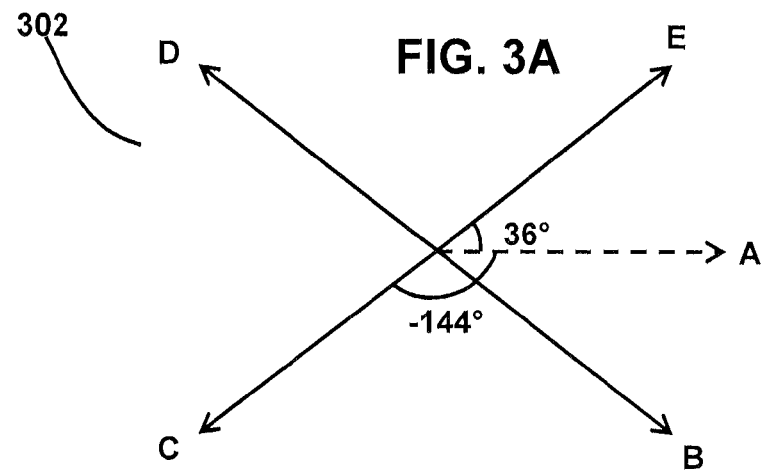
Figure 3C:
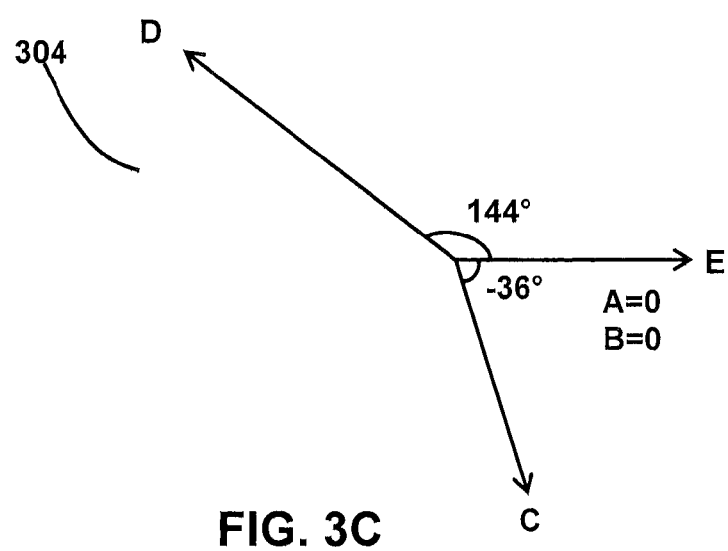

Secondly, the phase shift of the current applied to the second set of phases is determined such that the second harmonic torque ripple is within a determine threshold of zero. FIGS. 3A-3C illustrate the phase shift between current phasors when a five-phase electric motor is operating under three operating conditions. FIG. 3A illustrates the phase shift 300 between the current phasors when the five-phase electric motor is operating under a first operating configuration where the first set of phase windings receiving power include all five phase windings A, B, C, D, and E. The phase angle 306 between each of the current phasors is equal, i.e. 72°. FIG. 3B illustrates the phase shift 302 between the current phasors when the five-phase electric motor is operating under a second operating configuration where the second set of phase windings receiving power include all but one of the phase windings, i.e., phase windings B, C, D, and E. In this example, phase A has been opened because of a fault detected for phase winding A. In this example, the angles between the phases in the second operating configuration, i.e. when the A phase is no longer operating B-E=72°, E-D=108°, D-C=72°, C-B=108°. FIG. 3C illustrates the phase shift 304 between the current phasors when the five-phase electric motor is operating under a third operating configuration where the third set of phase windings receiving power include all but two of the phase windings, i.e., phase windings C, D, and E. In this example, phases A and B have been opened because of a fault detected for phase windings A and B. In this example, the angles between the phases in the third operating configuration are E-D=144°, D-C=144°, C-E=72°. The angle between the phases can be optimized depending on the design of the motor to provide the least torque pulsation.

A more accurate compensation of torque ripple in permanent magnet motors may be provided by cancelling, or approximately cancelling, the flux harmonics that create the second harmonic torque ripple. To cancel, or approximately cancel, the flux harmonics that create the second harmonic torque ripple an analytical field solution of the air gap flux density due to the permanent magnets may be used. The instantaneous torque may be derived using the instantaneous gap flux density and the current sheet distribution:

$$T_a(\theta) = \frac{2\pi r^2 l}{N} \sum_{i=1}^{N} B_{PM}\left(\frac{2\pi}{N}i + \theta\right) K_a\left(\frac{2\pi}{N}i\right)$$

Where $B_{PM}$ is the air gap flux density function, N is the number of samples, r is the air gap radius, l is the stack length and $K_a$, is the surface current density given by:

$$K\left(\frac{2\pi}{N}i\right) = \pm \frac{I_M}{w_s}$$

if $$\frac{2\pi}{N}$$

i is in a slot of "A" phase and 0 elsewhere.

The total torque is the sum of the torques due to all the phases:

$$T(t) = \sum_{j=1}^{N_{ph}} \sum_{k=1}^{N} T_k \sin\left(\omega t - (j-1)\frac{2\pi}{N_{ph}}\right) i_j(t)$$

Where $T_k$ is the peak of the $k^{th}$ component of the per phase torque and $N_{ph}$ is the total number of phases.

In the absence of "A" phase, $i_a=0$. By proper choice of phase angles of $i_b$, $i_c$, $i_d$, $i_e$, and $i_n$ the second harmonic torque component can be cancelled. The amplitude and phase of the current to be injected to cancel the second harmonic torque is thus dependent on the configuration of the winding and the number of slots.

For induction motors a more accurate compensation of torque ripple may be provided by including the effect of the third harmonic magneto-motive force (MMF) produced by the modular stator winding. By injecting third harmonic currents into the stator phase windings it is possible to eliminate, or approximately eliminate, the second harmonic torque when operating under fault conditions. The total MMF is given by:

$$MMF(\varphi, t) = \sum_{j=1}^{N_{ph}} \left(N_{t1}\cos\left(\varphi - (j-1)\frac{2\pi}{N_{ph}}\right)i_{j1}(t) + N_{t3}\cos\left(3\varphi - 3(j-1)\frac{2\pi}{N_{ph}}\right)i_{j3}(t)\right)$$

Where $N_{t1}$ and $N_{t2}$ are the fundamental and third harmonic components of the stator winding function and $i_{j1}(t)$ and $i_{j3}(t)$ are the fundamental and third harmonic currents. The total MMF under healthy conditions, i.e. when there are no opened phases, that contributes to a net average torque and zero ripple torque is given by:

$$MMF(\varphi, t) = \frac{5}{4}(N_{t1}I_{m1}\cos(\omega t - \varphi) + N_{t3}I_{m3}\cos(3\omega t - 3\varphi))$$

In the case of a five-phase electric motor, the above two expressions can be equated under single and two phase faults to obtain the amplitude and phase angle of the healthy phases to reduce zero-ripple torque.

The system 100, shown in FIG. 1, may comprise one or more elements configured to carryout the functions of one or more of the electric motor 102, controller 104, monitoring device 106, power source 108, inverter 101 and/or other elements. The elements 101,102, 104, 106, 108, and/or other elements may be individual or combined. The elements 101,102, 104, 106, 108, and/or other elements may be co-located or located in separate locations. For example, elements 101,104, 106, 108, and/or other elements may be integrated with the electric motor 102. In other implementations, the elements 101,104, 106, 108, and/or other elements may be separate from the electric motor 102 and positioned elsewhere.

The monitoring device 106 and/or controller 104 may include electronic storage, one or more processors, and/or other components. The monitoring device 106 and/or controller 104 may include communication lines, or ports to enable the exchange of information with a network, each other, and/or the electric motor 102. Illustration of system 100, and elements 101,102, 104, 106, 108, and/or other elements in FIG. 1 is not intended to be limiting. The system 100, and elements 101,102, 104, 106, 108, and/or other elements may include a plurality of hardware, software, and/or firmware components operating together to provide the functionality attributed herein to system 100.

Processor(s) may be configured to provide information processing capabilities in system 100, such as with the monitoring device 106 and/or controller 104. As such, the processor may include one or more of a digital processor, an analog processor, a digital circuit designed to process information, an analog circuit designed to process information, a state machine, and/or other mechanisms for electronically processing information. The processor(s) may be configured to execute computer software and/or hardware components to operate the system 100.

FIG. 4 illustrates a method 400 of controlling a multiphase electric motor. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400. In other implementations, method 400, or steps thereof, may be implemented by mechanical or manual means.

At an operation 402, the transmission of power may be controlled to a first set of phases of a multiphase electric motor in accordance with a first operating configuration. For example, the first operating configuration may include a standard vector control scheme with space vector pulse width modulation (SVPWM), applied to each of the phases in the multi-phase electric motor. Operation 402 may be performed by a controller, such as controller 104 as shown in FIG. 1, in accordance with one or more implementations.

At an operation 404, the transmission of power to the first set of phases may be monitored. Operation 404 may be performed by a monitoring device, such as monitoring device 106 as shown in FIG. 1, in accordance with one or more implementations.

At an operation 406, a shorted phase in the first set of phases may be detected while the first set of phases are being operated in accordance with the first operating configuration. A shorted phase may be an indication that the phase has a fault. The step of detecting a shorted phase may comprise obtaining a resistance measurement. Such resistance measurement may be performed by an on-line DC voltage application to the system. Operation 406 may be performed by a controller, such as controller 104 as shown in FIG. 1, in accordance with one or more implementations.

At an operation 408, responsive to the detection of a shorted phase, the control of the transmission of power to the multiphase electric motor may be controlled, such that power may be transmitted to a second set of phases in accordance with a second operating configuration. The second operating configuration may be configured such that the second set of phases are controlled to lower the torque pulsation while maintaining the same copper loss as with the first operating configuration. The currents and/or phase shifts provided to the electric motor in the second operating configuration typically depend upon the design of the motor. Where the second set of phases comprises all of the phases of the first set of phases, barring the faulty phase, the motor may operate with reduced capacity. The first set of phases and the second set of phases may have at least one common phase. Operation 408 may be performed by a controller, such as controller 104 as shown in FIG. 1, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for controlling a multiphase electric motor comprising:
   controlling transmission of power to a first set of windings of a single drive multiphase electric motor in accordance with a first operating configuration;
   detecting a shorted winding in the first set of windings while the first set of windings are being operated in accordance with the first operating configuration, wherein detecting the shorted winding comprises determining whether a DC resistance of individual ones of the windings in the first set of windings has decreased to a resistance level that indicates the shorted winding; and
   responsive to detection of the shorted winding, adjusting control of the transmission of power to the multiphase electric motor such that power is transmitted to a second set of windings in accordance with a second operating configuration, wherein the first set of windings and the second set of windings have at least one common winding, and wherein the shorted winding is not included in the second set of windings.

2. The method of claim 1, wherein detecting the shorted winding further comprises:
   injecting a DC voltage through an inverter into individual ones of the windings in the first set of windings;
   measuring a current of the injected DC voltage; and
   determining the DC resistance of the individual ones of the windings in the first set of windings.

3. The method of claim 1, wherein the timing at which the at least one common winding receives power in the first configuration is different than the timing at which the common winding receives power in the second configuration.

4. The method of claim 1, wherein the step of controlling the transmission of power further comprises monitoring the transmission of power to the first set of windings of the multiphase electric motor.

5. The method of claim 4, wherein monitoring the transmission of power to the electric motor comprises monitoring one or more of the positive sequence, negative sequence, and/or zero sequence current and/or voltage signatures of the power transmitted to the first set of windings of the multiphase electric motor and/or the resistance of individual ones of the first set of windings of the multiphase electric motor.

6. The method of claim 1, wherein the step of detecting the shorted winding in the first set of windings while the first set of windings are being operated in accordance with the first operating configuration further comprises determining parameters for the transmission of power to the multiphase electric motor such that the power is transmitted to the second set of windings in accordance with the second operating configuration.

7. The method of claim 6, wherein the determining parameters for the transmission of power to the multiphase electric motor includes:
   determining a current magnitude for the power transmitted to individual ones of the second set of windings of the multiphase electric motor; and
   determining a phase of a current for the power transmitted to individual ones of the second set of windings of the multiphase electric motor.

8. The method of claim 7, wherein the determined current magnitude for the power transmitted to individual ones of the second set of windings is determined such that a total copper loss for the electric motor being operated in the second operating configuration is within a defined threshold of the total copper loss for the electric motor being operated in the first operating configuration.

9. The method of claim 7, wherein the phase shift for the current of the power transmitted to individual ones of the second set of windings is determined such that the standard harmonic torque ripple of the second set of windings of the electric motor being operated in the second operating configuration is within a defined threshold of a standard harmonic torque ripple for the electric motor being operated in the first operating configuration, and the total zero sequence current is zero.

10. The method of claim 1, wherein the step of adjusting control of the transmission of power to the multiphase electric motor such that power is transmitted to a second set of windings in accordance with a second operating configuration comprises transmitting power having a current with a determined current magnitude and a determined phase shift to individual ones of the second set of windings.

11. The method of claim 1, wherein detecting the shorted winding further comprises comparing DC resistance of individual ones of the windings in the first set of phases with each other and/or with previous measurements to obtain a measure of change of the DC resistance of the individual ones of the windings in the first set of phases.

12. A system for controlling a multiphase electric motor comprising:
   a controller configured to control transmission of power to a first set of windings of a single drive multiphase electric motor in accordance with a first operating configuration; and
   a monitoring device configured to detect a shorted winding in the first set of windings while the first set of windings are being operated in accordance with the first operating configuration, wherein the monitoring device is further configured to determine whether a DC resistance of individual ones of the windings in the first set of windings has decreased to a resistance level that indicates the shorted winding;
   wherein the controller is configured to, in response to detection of the shorted winding by the monitoring device, adjust control of the transmission of power to the multiphase electric motor such that power is transmitted to a second set of windings in accordance with a second operating configuration, wherein the first set of windings and the second set of windings have at least one common winding, and wherein the shorted winding is not included in the second set of windings.

13. The system of claim 12, wherein the controller is further configured to inject a DC voltage through an inverter into individual ones of the windings in the first set of windings and wherein the monitoring device is further configured to measure a current of the injected DC voltage and determine the DC resistance of the individual ones of the windings in the first set of windings.

14. The system of claim 12, wherein the timing at which the common winding receives power in the first configuration is different than the timing at which the common winding receives power in the second configuration.

15. The system of claim 12, wherein the monitoring device is further configured to monitor the transmission of power to the first set of windings of the multiphase electric motor.

16. The system of claim 15, wherein the monitoring device is further configured to monitor one or more of the positive sequence, negative sequence, and/or zero sequence current and/or voltage signatures of the power transmitted to the first set of windings of the multiphase electric motor, and/or the resistance of individual ones of the first set of windings of the multiphase electric motor.

17. The system of claim 15, wherein the monitoring device is further configured to determine parameters for the transmission of power to the multiphase electric motor, such that the power is transmitted to a second set of windings in accordance with the second operating configuration.

18. The system of claim 17, wherein the monitoring device is further configured to:
   determine a current magnitude for the power transmitted to individual ones of the second set of windings of the multiphase electric motor; and
   determine a phase shift of a current for the power transmitted to individual ones of the second set of windings of the multiphase electric motor.

19. The system of claim 18, wherein the determined current magnitude for the power transmitted to individual ones of the second set of windings is determined such that a total copper loss for the electric motor being operated in the second operating configuration is within a defined threshold of the total copper loss for the electric motor being operated in the first operating configuration.

20. The system of claim 18, wherein the phase for the current of the power transmitted to individual ones of the second set of windings is determined such that a standard harmonic torque ripple of the second set of windings of the electric motor being operated in the second operating configuration is within a defined threshold of a standard harmonic torque ripple for the power transmitted to the electric motor being operated in the first operating configuration, and the total zero sequence current is zero.

21. The system of claim 12, wherein the controller is further configured to transmit power having a current with a determined current magnitude and a determined phase shift to individual ones of the second set of windings.

22. The system of claim 12, wherein the monitoring device is further configured to compare DC resistance of individual ones of the windings in the first set of phases with each other and/or with previous measurements to obtain a measure of change of the DC resistance of the individual ones of the windings in the first set of phases.

* * * * *